(No Model.) 2 Sheets—Sheet 1.

B. F. WARNER.
GRAIN METER.

No. 416,525. Patented Dec. 3, 1889.

Witnesses:
P. M. Hulbert
J. Paul Mayer

Inventor:
Ben Frank Warner
By Thos. S. Sprague & Son
Att'y.

(No Model.) 2 Sheets—Sheet 2.

B. F. WARNER.
GRAIN METER.

No. 416,525. Patented Dec. 3, 1889.

Witnesses:

Inventor:
Ben Frank Warner
By Thos. S. Sprague & Son
Atty.

UNITED STATES PATENT OFFICE.

BEN FRANK WARNER, OF HOMER, MICHIGAN.

GRAIN-METER.

SPECIFICATION forming part of Letters Patent No. 416,525, dated December 3, 1889.

Application filed February 16, 1889. Serial No. 300,090. (No model.)

*To all whom it may concern:*

Be it known that I, BEN FRANK WARNER, a citizen of the United States, residing at Homer, in the county of Calhoun and State of Michigan, have invented certain new and useful Improvements in Grain-Weighing Attachments for Thrashing-Machines, of which the following is a specification, reference being had therein to the accompanying drawings.

This invention relates to new and useful improvements in grain weighing and bagging attachments to thrashing-machines; and the invention consists in the construction, arrangement, and combination of different parts, all as more fully hereinafter described, and shown in the accompanying drawings, in which—

Figure 1:
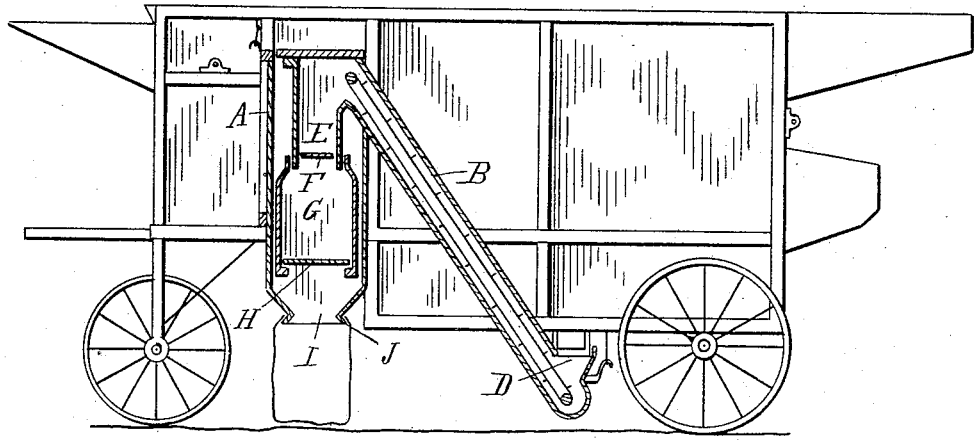
Figure 2:
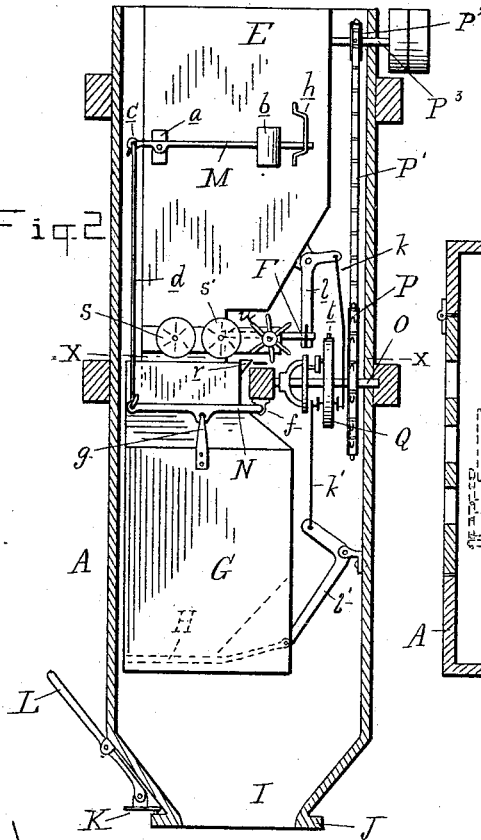
Figure 3:
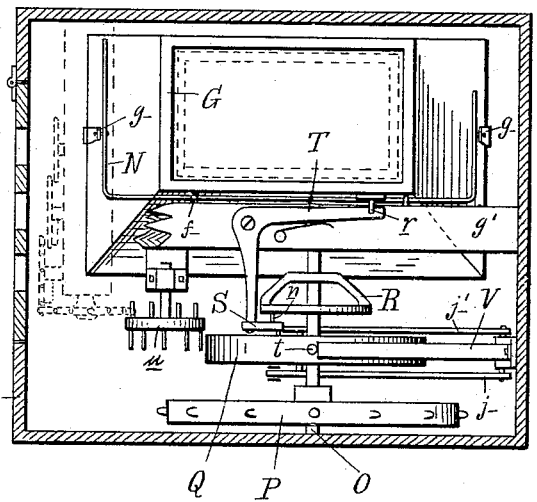
Figure 4:
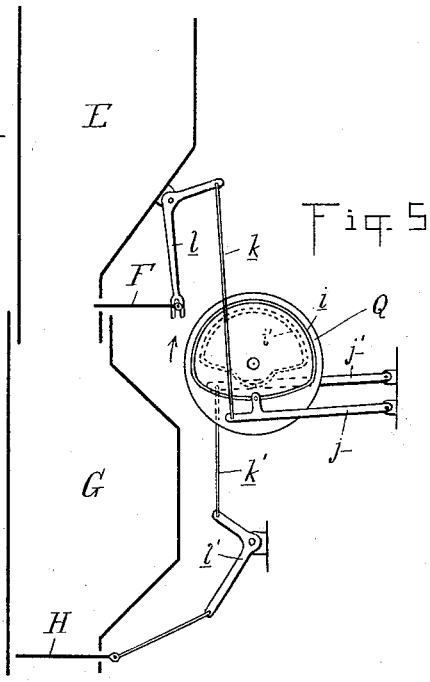
Figure 5:
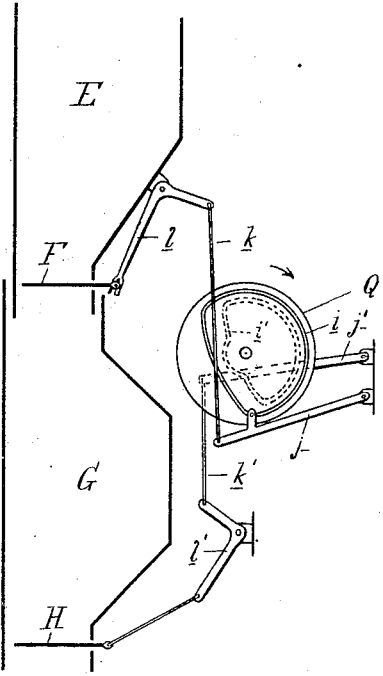
Figure 6:
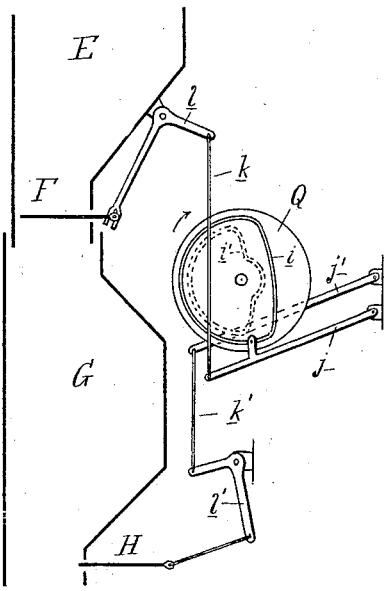
Figure 7:
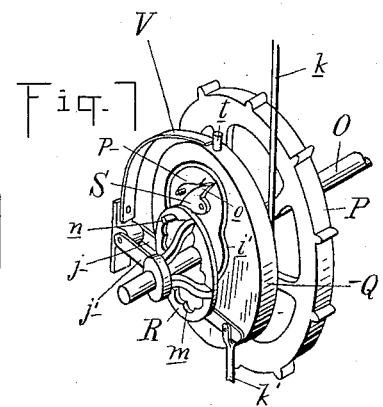

Figure 1 is a diagram elevation of a thrashing-machine, to which my device is applied, and with the latter shown in vertical section in diagram. Fig. 2 is an elevation of the grain-weighing device proper detached, and with one side of the trunk in which the same is inclosed broken away, said side being the one opposite that to which the elevator is connected. Fig. 3 is a horizontal section in line X X in Fig. 2. Figs. 4, 5, and 6 are diagrams illustrating the relative positions of the doors in the hopper and scale, respectively, in three different positions; and Fig. 7 is a perspective view of the trip-clutch mechanism.

A is a vertical trunk detachably secured in any suitable manner to one side of the thrashing-machine, in such relative position thereto as will hereinafter more fully appear.

B is an elevator connected to the upper portion of the trunk and with its lower end extended into suitable proximity to the grain-spout of the thrashing-machine to receive the grain discharged from said grain-spout through a suitable opening D and elevated into a hopper E, which is filled within the upper portion of the trunk. This elevator is driven by power derived by suitable connection with the thrashing-machine, and is constructed integrally with the trunk A and forming therewith an attachment to the thrashing-machine, secured thereto by suitable hooks, as may be found most convenient with the particular style of thrashing-machines used. The hopper E is provided near its lower end with a sliding door F.

G is a grain receptacle or scale risingly and fallingly supported below the hopper E, provided at its lower end with a sliding door H. Below the sliding door the trunk is constructed to form the discharge-spout I, around which there is a ledge J, to hold the mouth of the bag, which is either clamped thereon by suitable devices or preferably drawn around by distending the mouth of the bag to one side by a suitable arm K, pivotally secured on one side of the ledge, and which may be folded up against the trunk or extended therefrom by the operation of a lever L.

The grain receptacle or scale is risingly and fallingly supported from the end of a scale-beam M, which, as shown in Fig. 2, is pivotally secured at $a$ to one side of the hopper E, and has the weight $b$ adjustably secured to it. To the free end $c$ of the scale-beam is pivotally secured the hanger $d$, the lower end of which is secured to the rising-and-falling lever N, which is journaled in bearings $f$, and from which the grain-scale is suspended by means of hooks $g$ on the sides of the grain-scale and pivotally engaging with the double lever N, all so arranged that if a certain weight of grain corresponding with a certain quantity of grain (say one-half bushel) is confined in the grain-receptacle it will, by means of the connection described, swing the scale-beam M, thereby allowing the grain-receptacle to drop a little distance, according to the play provided for the scale-beam M by means of the stops $h$.

The automatic weighing of the grain is accomplished by the following device: Upon a shaft O, journaled within the trunk, is secured the sprocket-wheel P, to which motion is conveyed by a sprocket-chain P' from the sprocket-pinion P² on the shaft P³ of the elevator. This shaft O is provided with a cam-wheel Q, journaled loosely upon the shaft and provided upon its opposite sides with cam-grooves $i$ and $i'$, each of which engages an oscillating lever $j$ and $j'$, by means of a wrist-pin projecting therefrom laterally into the grooves. The oscillating lever $j$ operates through a connecting-rod $k$ the bell-crank lever $l$, which latter moves the door F in the hopper in and out. The lever $j'$ operates through the connecting-rod $k'$ the bell-crank lever $l'$, which moves the door H in the receptacle in and out. The cam-wheel Q forms the loose member of a clutch, of which the wheel R forms the fast member. This wheel R is provided with an inner face resembling a zigzag or wave line formed by a concentric series of notches $m$. In connection with this fast member of the clutch the loose member or cam-wheel is provided with a dog S, pivotally secured thereto and provided at one end with the stud or pin $n$ and at the other end with the arm $o$. The dog S is provided with a suitable spring $p$, which normally keeps the stud $n$ into engagement with one of the series of notches $m$, and thereby transmits the motion from the fast member R to the loose member or cam-wheel Q.

T is a bell-crank-shaped tripping-lever pivotally secured upon the cross-bar $g'$ of the frame. One arm of this cross-bar projects into the path of the arm $o$ of the dog S, and the other arm projects into the path of the wedge-shaped projection or detent $r$, secured to the receptacle G, all so arranged that the falling of the receptacle G causes the wedge-shaped detent $r$ to oscillate the trip-lever T, and thereby move it out of the path of the arm $o$ of the dog S. A suitable register comprising the usual dials $s$ and $s'$ is actuated through a proper train of gearing from the cam-wheel Q, which, to this end, is provided with a tooth $t$ upon its periphery actuating the pin-wheel $u$ at each revolution, and thereby transmits the motion of the train of gearing actuating the meter.

V is a back-stop acting on the face of the cam-wheel Q in connection with the tooth $t$.

In practice, the parts being constructed and arranged as shown and described, they are intended to operate as follows: The grain issuing from the spout of the thrashing-machine discharges into the bottom of the elevator, and is carried thereby into the hopper E, and, provided the door F is open, drops into the grain-receptacle G. The doors F and H, which respectively close the bottom of the hopper and grain-receptacle, open and close inversely to each other, and thus if the door F is open the door H is closed; so as soon as the weight of the grain in the grain-receptacle reaches a certain fixed weight, according to the adjustment of the weight $b$ in the scale-beam M, it will swing the scale-beam, allowing the grain-receptacle G to drop a certain distance. This is sufficient for the wedge $r$ upon the grain-receptacle to actuate the trip-lever T with the result to release its engagement with the arm $o$ of the dog S. This dog S, being now free, will engage with its stud $n$ into the fixed member R of the clutch on the shaft O. The resulting motion of the cam-wheel Q will actuate the operating mechanism of the doors from the position shown in Fig. 4 into the position shown in Fig. 5, in which both doors are shown closed. This is effected by the peculiar shape of the cam-grooves. Figs. 4, 5, and 6 illustrate the peculiar positions of the doors as controlled by these cam-grooves. Fig. 4 shows the position while the cam-wheel is not in gear, and it will be seen that at the moment motion is imparted to the cam-wheel the cam-groove $i$, actuating the upper door, acts with its eccentric portion to close the upper door quickly, while the cam-groove $i'$, controlling the lower door, continues with its concentric portion to keep the lower door closed until the relative position of the door shown in Fig. 5 is obtained. Now, it will be seen that the cam-groove controlling the lower door will begin to open the lower door, while the upper door is controlled by the concentric portion of the cam-groove $i$ and remains closed until the relative position (shown in Fig. 6) is obtained, in which the lower door just begins to close, while the upper door still remains closed, after which the doors are moved into the relative positions shown in Fig. 4, at which time one revolution of the cam-wheel is completed and the motion of the cam-wheel ceases, as the lower receptacle G has by this time been emptied of the grain and drawn back to its normal position, in which the trip-lever T trips the dog S, and thereby prevents the cam-wheel from having any further motion until the operation before described is repeated. The object of thus moving the doors in relation to each other, it will be easily understood, is for the purpose of preventing any grain falling into the lower receptacle after it has received its weight of grain and is relieved therefrom by the opening of the door H until said door is again closed, when the upper door is allowed to open and discharge its grain meanwhile received from the elevator.

One peculiar advantage of my construction is that I open and close the doors by mechanism actuated by power derived from other sources than from the weight of the grain-receptacle, as is the usual practice in constructions in the present use. It will be readily understood that by relieving the falling grain-receptacle of any work an element of uncertainty in weighing is eliminated, as it takes naturally some power to move the doors, and the amount of power also varies with the condition of the grain and other circumstances, and thereby a variable factor is liable to influence the weighing, provided the opening and closing of the doors are accomplished by the weight of the falling receptacle. This is entirely avoided in my construction, and all the falling receptacle has to do is to trip the clutch, which is comparatively little work, and, moreover, is of fixed resistance, which cannot produce variations in weighing.

It is well known that great difficulty is encountered in grain-receptacles in effecting the proper movement of the doors. This I have accomplished in a very simple and positive manner, and by inclosing the whole device in an outer trunk I prevent the mechanism from being interfered and tampered with. For the purpose of adjusting the scales and reading the dials, I arrange a door in the side of the trunk, preferably provided with openings, whereby the dials may be read.

The whole attachment may be readily attached to the side of a thrashing-machine, obvious modifications being made to adapt my device to the styles in present use.

What I claim as my invention is—

1. In a grain-weighing attachment, the combination of the stationary hopper, the rising-and-falling grain-weighing receptacle swung on the scale-beam, the doors in the bottom of the hopper and grain-receptacle, respectively, the actuating mechanism of said doors operated by power independent of the weight of the grain-receptacle, a clutch in said mechanism embracing a cam-wheel and the bell-crank levers $l$ and $l'$, and a tripping device controlled by the rising-and-falling grain-receptacle to throw the actuating mechanism of the doors in and out of gear, substantially as described.

2. In a grain-weighing attachment, the combination, with the hopper and the risingly and fallingly supported grain-weighing receptacle, of the sliding doors in the discharge end of said hopper and receptacle, respectively, a revolving shaft operated by power independent of the weight of the grain-receptacle, a clutch on said shaft, including a loose member provided with cam-grooves, actuating mechanism operated by the loose member of said clutch and to open and close the aforesaid doors and including the bell-crank levers $l$ and $l'$, and a tripping device for said clutch to throw said actuating mechanism into gear by the falling of the grain-weighing receptacle, substantially as described.

3. In a grain-weighing attachment, the combination, with the hopper and the grain-weighing receptacle risingly and fallingly supported by the scale-beam, of the sliding doors F and H in said hopper and grain-receptacle, respectively, the revolving shaft operated by independent power, the clutch on said shaft, the cam-wheel Q, forming the loose member of said clutch, the cam-grooves $i$ and $i'$ on said cam-wheel, and the actuating mechanism of the doors consisting of the levers $j$ and $j'$, the connecting-rods $k$ and $k'$, and the bell-crank levers $l$ and $l'$, respectively, substantially as described.

4. The combination, with the sliding doors F and H of the hopper and grain-weighing receptacle, respectively, of the shaft O, the cam-wheel Q, loosely journaled on that shaft and provided with cam-grooves $i$ and $i'$ in said cam-wheel, the actuating mechanism of the doors operated by said cam-wheel, the dog S, pivotally secured to the cam-wheel and provided with the stud $n$ and arm $o$, the wheel R, fast upon the shaft and provided with the interior series of notches $m$, the trip-lever T, and the detent $r$ of the grain-receptacle to actuate said trip-lever, all combined to operate substantially as described.

5. The combination, in a grain-weighing attachment to thrashing-machines, of the stationary hopper, the grain-weighing receptacle risingly and fallingly supported from the scale-beam, the inclosing-trunk of the hopper of the grain-weighing receptacle and provided with a discharge end adapted to secure bags thereto, the sliding doors in the hopper and grain-weighing receptacle, respectively, the actuating mechanism of said doors operated by power independent of the weight of the grain-receptacle, the grain-meter operated by a train of gear connected with said power, a clutch in said actuating mechanism, including a grooved cam-wheel, and a tripping device controlled by the rising-and-falling grain-receptacle to throw the actuating mechanism of the doors and grain-meter in and out of gear, substantially as described.

In testimony whereof I affix my signature, in presence of two witnesses, this 21st day of January, 1889.

BEN FRANK WARNER.

Witnesses:
J. PAUL MAYER,
ED. MCBREARTY.